United States Patent [19]
Räsänen et al.

[11] Patent Number: 5,920,545
[45] Date of Patent: Jul. 6, 1999

[54] NON-TRANSPARENT DATA TRANSMISSION IN A DIGITAL TELECOMMUNICATIONS SYSTEM

[75] Inventors: Juha Räsänen, Espoo; Jari Hämäläinen, Tampere; Mikko Kanerva, Helsinki; Hannu Kari, Veikkola; Jari Vainikka, Vantaa, all of Finland

[73] Assignee: Nokia Telecommunications Oy, Espoo, Finland

[21] Appl. No.: 08/765,059

[22] PCT Filed: May 8, 1996

[86] PCT No.: PCT/FI96/00259

§ 371 Date: Apr. 1, 1997

§ 102(e) Date: Apr. 1, 1997

[87] PCT Pub. No.: WO96/36146

PCT Pub. Date: Nov. 14, 1996

[30] Foreign Application Priority Data

May 9, 1995 [FI] Finland ..................... 952253

[51] Int. Cl.⁶ .................. H04L 1/00; H04J 6/00
[52] U.S. Cl. ............. 370/232; 370/345; 370/347; 370/349; 370/229; 370/235; 370/236; 375/233; 371/32; 371/33; 395/200.56
[58] Field of Search .................. 370/232, 345, 370/347, 349, 229, 235, 236; 371/32, 33, 34; 375/233; 395/200.56

[56] References Cited

U.S. PATENT DOCUMENTS

| | | |
|---|---|---|
| 4,334,306 | 6/1982 | Ulug ..................... 370/235 |
| 4,691,314 | 9/1987 | Bergins et al. . |
| 4,888,767 | 12/1989 | Furuya et al. ............ 370/232 |
| 4,939,731 | 7/1990 | Reed et al. ............... 371/32 |
| 5,130,993 | 7/1992 | Gutman et al. . |
| 5,487,068 | 1/1996 | Smolinske et al. ......... 371/32 |
| 5,627,970 | 5/1997 | Keshav ............... 395/200.13 |

FOREIGN PATENT DOCUMENTS

| | | |
|---|---|---|
| 260 470 | 3/1988 | European Pat. Off. . |
| 350 238 | 1/1990 | European Pat. Off. . |
| 39 33 262 | 4/1991 | Germany . |
| 2 160 392 | 12/1985 | United Kingdom . |
| 2 253 546 | 9/1992 | United Kingdom . |

*Primary Examiner*—Brian Zimmerman
*Assistant Examiner*—Yonel Beaulieu
*Attorney, Agent, or Firm*—Pillsbury Madison & Sutro LLP

[57] ABSTRACT

A digital telecommunications system and method for non-transparent data transmission includes a non-transparent data connection between a transmitting party and a receiving party, on which channel coding is employed. The transmission buffer buffers the data frames to be transmitted and stores the transmitted data frames until it receives an acknowledgement of successful reception. This is avoided by monitoring the quality of the non-transparent connection, and if the quality of the the connection drops to a specific threshold value, by changing the channel coding scheme of the connection for a more efficient one. Simultaneously, however, more channel capacity is allocated for the connection in according with the chosen channel coding scheme so that the original nominal user data rate can be maintained unchanged or nearly unchanged.

14 Claims, 4 Drawing Sheets

|   | 8 | 7 | 6 | 5 | 4 | 3 | 2 | 1 |   |
|---|---|---|---|---|---|---|---|---|---|
| 0 | SA | SB | X | 0 | 0 | 0 | 1 | 1 |   |
| 1 | 1 | 1 | 0 | 0 | 0 | 1 | 1 | 1 | IA5 "G" |
| 2 | 1 | 1 | 0 | 1 | 0 | 0 | 1 | 1 | IA5 "S" |
| 3 | 1 | 1 | 0 | 0 | 1 | 1 | 0 | 1 | IA5 "M" |
| 4 | SA | SB | X | 1 | 1 | 1 | 1 | 1 |   |
| n |   |   |   |   |   |   |   |   |   |

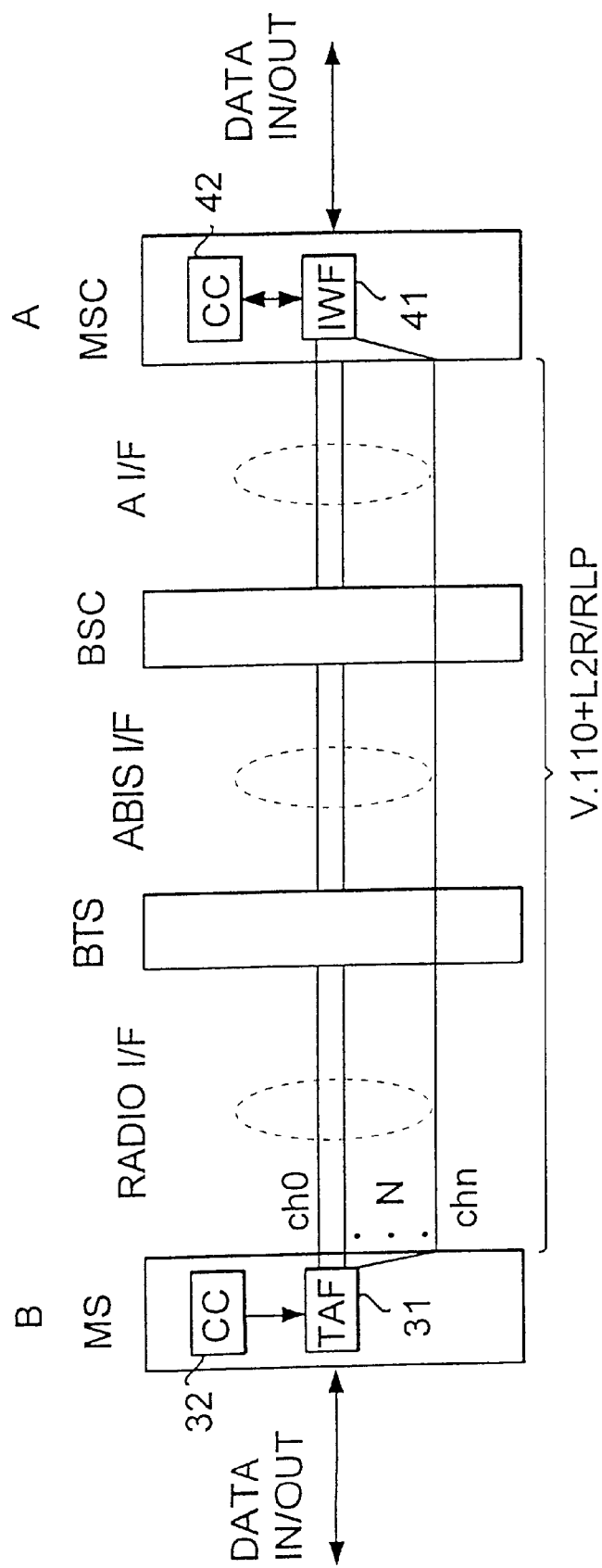

NON-TRANSPARENT DATA TRANSMISSION IN A DIGITAL TELECOMMUNICATIONS SYSTEM

This application is the national phase of international application PCT/FI96/00259 filed May 8, 1996 which designated the U.S.

FIELD OF THE INVENTION

The present invention relates to non-transparent data transmission in a digital telecommunications system, in particular in a radio interface of a mobile communications system.

BACKGROUND OF THE INVENTION

The problem in transmission over transmission channels that are sensitive to interference, such as the radio path, is often the poor quality of the transmission. Although several standardized end-to-end data services are actually provided with error correction protocols, which are applied either to the entire end-to-end connection or to some segments of the transmission path, these protocols are designed for error situations that are typical of fixed lines, but they are inadequate or unsuitable for special conditions, such as to a radio link. Therefore, it has been necessary to implement dedicated error correction solutions within the mobile communications system.

Since no single solution is suitable for all data services, there are several types of connections available e.g. in the pan-European mobile communications system GSM, and these connections may be divided into two classes. In the first class, error correction is carried out solely by means of channel coding, which in the GSM system is termed as Forward Error Correction (FEC). In the GSM recommendation this is termed as a transparent transfer mode, which is also abbreviated with "T". In the second connection class, in addition to channel coding, an additional protocol is applied, with re-transmission of data which has not been received correctly at the other end. In the GSM system this communication protocol is termed as a Radio Link Protocol (RLP), and this data transfer mode is referred to as non-transparent asynchronous data transmission, which is also abbreviated with NT. The present invention relates to the non-transparent data transmission.

In the non-transparent asynchronic data transmission over a circuit switched connection, data is transmitted from a transmitting party A to a receiving party B in RLP frames. The RLP frames are channel coded for the duration of transmission, so that the errors caused by the transmission channel can be corrected by the receiving party B in a channel decoding. In addition to the actual user data, RLP frames also contain error correction bits, by means of which the receiving party B can detect the errors that have not been corrected by channel coding. Each RLP frame is also numbered, or the order of the frames is indicated by another kind of identifier. The correctness of each received frame is tested at the receiving end. If the frame is detected to be correct, the receiving party acknowledges the reception by using the frame number. If the frame is not detected to be correct, a negative acknowledgement is transmitted. When the transmitting end receives a negative acknowledgement, or no acknowledgement at all, the transmitting party A re-transmits the RLP frame a predetermined number of times. The total number of the re-transmissions is limited in order to avoid endless transmission loops in a case of a very poor connection.

The RLP frames are stored, i.e. "buffered" at the transmitting end until they have been acknowledged, so that they are available if re-transmission is required. In order to limit the amount of buffering required, a sliding window is employed in the RLP protocol. Thus, the transmitting party A may transmit several RLP frames before an acknowledgement is required from the receiving party B. Since the errors passing through the channel coding are corrected by means of re-transmission of the defective RLP frames, "surplus capacity" must be reserved for re-transmission. This means that the data rate of the non-transparent connection is higher than the nominal data rate of the user. In a case where a channel has a relatively high quality, that is, when there are few errors passing the channel coding, this surplus capacity allows a sufficient number of re-transmissions without the actual data rate of the connection falling below the nominal user data rate. When the quality of the connection becomes poorer, the number of defective and lost RLP frames, and thus the number of re-transmissions increases. On extremely poor connections, buffering of the RLP frames, as well as flow control must be employed, which limits the amount of incoming data from the user to the transmission buffer. This means in practice that the actual user data rate is lower than the nominal user data rate, i.e. the throughput of the connection decreases.

It is thus a problem associated with a poor transmission channel that when the number of re-transmissions increases, the throughput of the connection drops below the nominal user data rate. If the number of re-transmissions further increases, and the maximum number of re-transmissions set for the connection is reached in some frame, it results in resetting of the RLP protocol, whereby parties A and B reset their internal variables related to data transmission. In connection with RLP resetting, information loss may occur, and the continuity of data thus cannot be guaranteed. Data transmission is practically impossible in the RLP reset -state, which causes releasing the connection.

The effect of a poor transmission channel may be reduced by changing a better channel coding scheme for the connection, provided that there are several channel coding alternatives available in the system. E.g. the channel coding scheme FEC used in the GSM system is convolution coding, whose efficiency may be expressed in terms of a convolution code ratio X/Y, which indicates that in channel coding, X data bits are represented with Y code bits. On a full-rate GSM traffic channel, for instance, the convolution code ratios corresponding to the user data rates 9.6 kbit/s, 4.8 kbit/s, and 2.4 kbit/s are ½ (½ is a so-called buffered ratio, i.e. the ratio is not exactly ½), ⅓ and ⅙, respectively. On a half-rate traffic channel the corresponding convolution code ratios for user data rates 4.8 kbit/s and 2.4 kbit/s are ½ and ⅓. Taking into use a better and more efficient channel coding scheme thus requires lowering the nominal user data rate.

DISCLOSURE OF THE INVENTION

An object of the invention is to improve the throughput of non-transparent data transmission in poor transmission path conditions and maintain the nominal data rate and/or the connection in conditions in which prior art non-transparent data transmission fails.

This is achieved with a method for non-transparent data transmission in a digital telecommunications system, comprising the steps of: establishing a non-transparent data connection having a nominal data rate, a first transmission capacity and a first channel coding scheme; transmitting data over a non-transparent data connection in data frames using a communication protocol that acknowledges the received correct data frames and re-transmits the received defective data frames; buffering the data frames to be transmitted in a transmission buffer; storing a transmitted data frame in the transmission buffer in case of possible re-transmission, until an acknowledgement of successful reception is received. The invention is characterized by monitoring the throughput of the non-transparent data connection on the basis of the number of re-transmissions, requesting more transmission capacity and a more efficient channel coding scheme for said data connection if the throughput of the data connection drops to a predetermined threshold value.

The invention further relates to a telecommunications system in accordance with claim 8.

In the invention, the quality of a non-transparent connection is monitored, and, if the quality of the connection falls to a specific threshold value, a more efficient channel coding scheme is changed for the connection. More channel capacity is simultaneously allocated for the connection, however, in accordance with the chosen channel coding scheme so that the original nominal user data rate can be maintained unchanged or nearly unchanged. A half-rate traffic channel, for instance, may be changed for a full-rate traffic channel, and a more efficient channel coding scheme may simultaneously be taken into use. Correspondingly, in a system in which a multichannel connection can be used, the number of the channels may be increased so that a more efficient channel coding scheme may be taken into use without reducing the nominal data rate.

In an embodiment of the invention, the present channel coding scheme and channel capacity are maintained if there is no more channel capacity available. One or more new attempts are made for increasing the channel capacity and changing the channel coding scheme if the quality of the connection is still poor after a predetermined waiting time. In an embodiment of the invention, the channel coding scheme is changed for a more efficient one although there is no more channel capacity available after the new attempts either, if the throughput of the connection still falls below the predetermined threshold value. If the conditions of the connection improve, the surplus channel capacity may be removed from the connection and the original channel coding scheme may be restored. This releases channel capacity for other connections.

BRIEF DESCRIPTION OF THE DRAWINGS

In the following, the invention will be disclosed by means of the preferred embodiments with reference to the attached drawings, in which FIG. 5 illustrates a part of the GSM mobile communications system in which the invention may be applied on a multichannel non-transparent connection.

PREFERRED EMBODIMENTS OF THE INVENTION

The present invention may be used in all digital data transmission systems on a non-transparent data connection on which transmission errors are corrected, in addition to channel coding, by means of a transmission protocol that re-transmits the frames and causes the actual data rate to drop below the nominal data rate or the connection to be interrupted when the quality of the connection becomes poorer.

The present invention is suitable particularly for data transmission applications in digital CDMA or TDMA mobile communications systems, such as the pan-European digital mobile communications system GSM, DCS1800 (Digital Communication System), a mobile communications system in accordance with EIA/TIA Interim Standard IS/41.3, etc. The invention will be disclosed below by way of example of the GSM mobile communications system, but the invention is not limited thereto, however. The basic structure of the GSM system will be disclosed briefly below, but no closer attention will be paid to its features or other aspects of the system. The GSM system is described in more detail in "The GSM System for Mobile Communications", M. Mouly, M. Pautet, Palaiseau, France, 1992, ISBN:2-9507190-0-7, which is incorporated herein by reference.

A mobile services switching center MSC switches incoming and outgoing calls. It carries out tasks similar to the exchange of the public switched telephone network (PSTN). In addition, it also carries out functions typical of mobile telecommunication only, such as location management of the subscribers in cooperation with the subscriber registers (not shown) of the network. Mobile stations (MS) are connected to the MSC via base station systems BSS. A base station system BSS consists of base station controllers BSC and base stations BTS.

The GSM system is a time division multiple access system in which communication on the radio path takes place in successive TDMA frames, each of which consists of several time-slots. In each time-slot a short information package is sent in form of a radio frequency burst having a finite duration and consisting of a group of modulated bits. The time-slots are mainly used for transmitting control channels and traffic channels. On traffic channels, speech or data is transmitted. On control channels, signalling is carried out between the base station and the mobile station. The channel structures used in the radio interface of the GSM system are defined in closer detail in the GSM recommendation 05.02. In the operation in accordance with the recommendation, one time-slot is assigned to a mobile station MS as a traffic channel at the beginning of the call (Single Slot Access). The mobile station MS is synchronized with this time-slot for transmitting and receiving radio frequency bursts.

Figure 1:
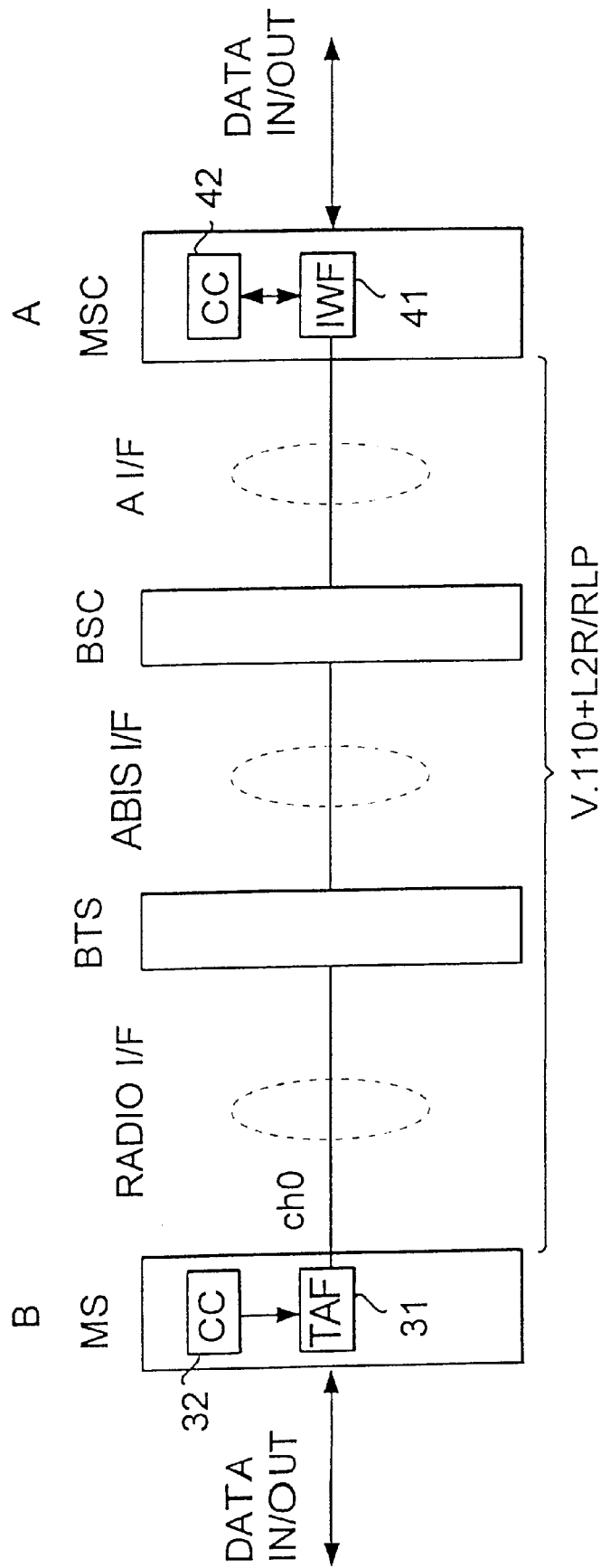
FIG. 1 illustrates a part of a mobile communications system in which the invention may be applied on a single-channel non-transparent connection.

In the GSM system, a data connection is established between a terminal adaptation function (TAF) 31 of the mobile station MS and an interworking function (IWF) 42 of a fixed network (usually associated with the MSC). A data connection is a circuit switched connection, which reserves one (or more) traffic channels from the radio interface for the duration of entire call. In the data transmission of the GSM network, the data connection is a V.110 rate-adapted, V-24 interface-adaptable, UDI coded digital full duplex connection. A V.110 connection is a digital transmission channel that has originally been developed for ISDN technology (integrated Services Data Network), which is defined in CCITT Recommendation Blue Book V.110. A terminal adaptation function TAF adapts a data terminal TE connected to the mobile station MS to the V.110 connection, which is established in FIG. 1 over a circuit switched connection that employs one traffic channel chO. The interworking function IWF adapts the V.110 connection to some other V.110 network, such as ISDN or another GSM network, or to some other transit network, such as the public switched telephone network PSTN.

In addition, channel coding FEC (Forward Error Correction) is employed on the traffic channel for reducing the effect of transmission errors on the radio path. In the GSM system convolution coding in accordance with GSM recommendation 05.03 is employed, and its efficiency can be expressed by means of a convolution coding ratio, which indicates that in channel coding X data bits are represented with Y code bits. On a full-rate GSM traffic channel, for instance, the convolution code ratios corresponding to the user data rates 9.6 kbit/s, 4.8 kbit/s, and 2.4 kbit/s are ½(buffered), ⅓ and ⅙, respectively.

The non-transparent circuit switched connection between the terminal adaptation function (TAF) and the interworking function (IWF) on a GSM traffic channel comprises several protocol layers.

The terminal interface between the terminal adaptation function TAF of the mobile station MS and the data terminal equipment, as well as the interface between the interworking function IWF and e.g. an audio modem MODEM comply with CCITT V.24, and it is marked with a symbol L2 in the figure. Protocols that are essential to the invention are L2R (Layer 2 Relay) and RLP (Radio Link Protocol), which are both located between the terminal adaptation function TAF and the interworking function IWF at both ends of the connection. In accordance with the invention, the connection also includes several rate adaptation RA functions, such as RA1' between the terminal adaptation function TAF and a CCU unit (Channel Codec Unit) placed in the BSS, RA1 between the CCU unit and the interworking function IWF, RAA between the CCU unit and a transcoder unit TRAU placed separate from the base station, and RA2 between the transcoder unit TRAU and the interworking function IWF. The rate adaptation functions RA are defined in GSM specifications 04.21 and 08.20. Communication between the CCU unit and the transcoder unit TRAU is defined in GSM recommendation 08.60.

Information that has been rate adapted at the radio interface RA1' has also been channel coded in the way specified in GSM Recommendation 5.03. This is illustrated by blocks FEC in the mobile station MS and in the CCU unit.

The object of the invention is, however, only the L2R/RLP operation of the terminal adaptation function TAF and the interworking adaptation function IWF and the communication between them. The other lower-layer protocols, functions and units mentioned above only provide a transmission path in accordance with the GSM recommendations between the L2R/RLP units, and they are not relevant to the invention except for channel coding. Therefore, they are not paid closer attention to herein.

Figures 3, 4:
FIG. 3 shows a L2R PDU, FIG. 4 an RLP frame.

L2R (Layer 2 Relaying) functionality for non-transparent character-oriented protocols is defined e.g. in GSM Recommendation 07.02. L2R packs the user data and status information received from the terminal interface in protocol data units PDU having a length of 200 bits, or 25 octets. A PDU is illustrated in FIG. 3. The octets are numbered from 0 to 24, whereby octet 0 is transmitted first. The bits in octets are numbered from 1 to 8, and bit 1 is transmitted first. An octet in a PDU may be a status octet, a character (higher layer data), or dummy bits. Octet 0 is always a status octet. One status octet contains 3 bits: SA, SB, and X for the status of the V.24 connection, and 5 bits for indicating the number of the data octets subsequent to the status octet, as well as special indications, such as an empty PDU. In FIG. 3, status octet 0 is followed by 3 data octets in which the word "GSM" is packed, whereafter a new status octet 4 follows.

L2R PDU's are packed into a frame in accordance with the RLP protocol, which is shown in FIG. 4. The RLP protocol is defined in GSM Recommendation 04.22. The RLP is a balanced (HDLC type) data transmission protocol with a frame structure, in which error correction is based on re-transmission of defective frames on request of the receiving party. The RLP extends from the terminal adaptation function TAF of the MS to the interworking function IWF, which is usually placed in the MSC. In accordance with FIG. 4, the RLP frame structure contains a header field (16 bits), an information field (200 bits) and a frame check sequence (24 bits). A 200-bit L2R PDU is packed into the information field. The net RLP data rate is thus distinctively above the highest possible user rate 9.6 kbit/s allowed for one channel, which enables a certain number of re-transmissions without reducing the nominal user rate. When the user rate in the terminal interface is 9600 kbit/s, for instance, and the data rate in the radio interface is 12 kbit/s, this "surplus capacity" is about 12.5 %.

The RLP protocol is also connected with flow control, which is used for controlling the fill level of the reception and transmission buffers. This flow control is described e.g. in GSM Recommendation 07.02. The L2R/RLP unit of the receiving party B immediately transmits a "flow control active" indication to the transmitting party A if the reception buffer seen from the direction of the radio path reaches a predetermined threshold value or if the terminal equipment TE has initiated local flow control at the terminal interface. In the latter case, upon receiving the flow control indication from the terminal interface, L2R/RLP interrupts data transmission from the reception buffer to the terminal interface. When the congestion of the buffer or local flow control is removed, L2R/RLP sends a "flow control inactive" indication. In addition, data transmission from the reception buffer is restarted. The L2R/RLP unit of the transmitting party A activates local flow control immediately when the transmission buffer reaches a predetermined threshold value or when L2R/RLP receives the "flow control active" indication from the receiving party B. When the congestion of the buffer is removed, or when the "flow control inactive" indication is received, L2R/RLP will cancel local flow control. The transmission buffer buffers data received from the V.24 interface so that no data will be lost in case the mobile station MS is not able to transmit data immediately over the radio path. The reception buffer buffers data, which is transmitted to the V.24 interface so that no data received from the traffic channel is lost in case the data cannot be forwarded immediately via the V.24 interface e.g. to the terminal equipment TE. Said predetermined threshold value that activates the flow control can be e.g. a half-full transmission or reception buffer.

As it was stated above, the RLP protocol is attended by the problem that when the quality of the connection becomes poorer, the number of defective and lost frames, and thus the number of re-transmissions increases. On extremely poor connections, buffering of the RLP frames, as well as flow control described above must be employed. In practice this means that the actual use rate is lower than the nominal user data rate, that is, the throughput of the connection decreases.

In accordance with a preferred embodiment of the invention, it has been endeavoured to solve this problem so that the L2R/RLP unit of the transmitting party monitors the quality of the connection by reducing the throughput of the connection, and advantageously also by monitoring the fill level of the transmission buffer. The number of the re-transmissions of the RLP frames is not limited either, unlike in the RLP protocol in accordance with the GSM recommendations, so that resetting of the RLP connection is avoided. As stated above, resetting takes place in the present GSM system when the number of re-transmissions reaches the maximum value.

An embodiment will be described herein by way of example, in which the transmitting party monitors the quality of the connection, changes the channel coding scheme and requests additional capacity. These procedures, however, may alternatively be carried out by the receiving end according to the same principles. In such a case, either the transmission buffer is not monitored, or the fill level of the transmission buffer is concluded from the "flow control active" indication obtained from the transmitting end.

If the fill level of the transmission buffer reaches the predetermined value and the throughput drops to the predetermined value, the channel coding scheme FEC of the connection is changed for a more efficient one, and more channel capacity is requested. Due to a better channel coding scheme FEC the residual error rate that remains to be corrected by the RLP protocol is lower than prior to changing the channel coding scheme. Since radio channel capacity has possibly been increased to meet the needs of the new channel coding scheme, the nominal data rate can be maintained unchanged or nearly unchanged.

If there is no additional channel capacity available, however, L2R/RLP continues transmitting with the present transmission configuration. A L2R/RLP unit contains a retry timer, however, which is activated at this stage. If the quality of the connection is still the same after the timer has expired, a new attempt is made for increasing the channel capacity, and in case this new attempt fails, the timer is activated again. etc. If the throughput of the connection further decreases to a lower predetermined value during this procedure, the channel coding scheme is changed to a more efficient one in any case without additional channel capacity in order to improve error correction. It is thus possible to maintain the connection, even if with a lower user rate. A sensible lower value predetermined for the throughput is some value below the following higher nominal data rate of the channel coding scheme FEC.

If the radio conditions improve again, additional channel resources may be returned and the channel coding scheme may be changed back to the original. The decision on returning the original configuration may be based on a predetermined throughput value.

The channel coding scheme is changed by means of a Channel Mode Modify (CMM) procedure, which is described e.g. in GSM Recommendation 04.08, pp. 53–54 and 181–182. Both channel allocation and the CMM procedure are controlled in the preferred embodiment of the invention by the MSC, in particular its call control CC (42).

1.0 Decision criterion for requesting channel resources

Upon monitoring the fill level of the transmission buffer, the activating threshold of the flow control described above is used for activating the request state. In that case, hysteresis is used in order to prevent the flow control from deactivating the request state, that is, once the request state has been activated, it is deactivated only after the fill level of the buffer has decreased to the lower threshold value.

Monitoring of the throughput is based on calculating the re-transmission rate of the frames. Since the transmission buffer is half-full, the RLP continuously transmits at the full rate. This rate is known on the basis of the channel capacity, e.g. in the case of one full-rate GSM traffic channel the rate is one frame/20 ms (50 frames/second). If, for instance, 55 % of the last transmitted frames are re-transmissions, 45 % of the capacity will be used for new frames.

Monitoring the throughput may also be based on calculating the "sliding or floating" of the success ratio e.g. with an equation:

$$AVE(n+1)=AVE(n)*(1-D)+MEAS*D$$

where

AVE(i) is an average value at instant i,

D is a "history co-efficient" (0<D<1),

MEAS is the last "measurement",

MEAS=1 represents a successfully acknowledged transmission,

MEAS=0 represents re-transmission of a frame, $0 \leq AVE(i) \leq 1$.

2.0 Decision criterion for releasing channel resources

Additional channel resources are released when user data transmission has continued at a full rate and with an average success ratio AVE(i) which is greater than the predetermined value (e.g. 0.8) for a predetermined period of time, e.g. 10 seconds or 100 seconds. This criterion maintains the additional allocated channel resources even in a case where the terminal equipment has temporarily stopped transmitting data. A pendulum between releasing channel resources and requesting channel resources is thus avoided, and channel resources are only released after actual improvement of the radio conditions.

The present invention may be applied both to single-channel service and multichannel high-speed circuit switched data service (HSCSD). In the following, both cases will be described by means of examples.

3.0 Application to a single-channel service, based on a half-rate channel

In the GSM system, it is possible to choose a so-called half-rate (max. 4.8 kbit/s) traffic channel (HR) for low rates. A half-rate traffic channel is established when a mobile station MS operates in a certain time-slot only in every second frame, i.e. at the half rate. There is another mobile station operating in every second frame of the same time-slot.

Let us assume that the mobile station Ms has a non-transparent circuit switched connection on a half-rate GSM traffic channel. Data transmission in accordance with the invention will be disclosed in the following assuming that the terminal adaptation function TAF is the transmitting party A and the interworking function IWF is the receiving party B. It must be noted, however, that data transmission takes place in the same way in the opposite direction IWF-TAF, as well.

The L2R/RLP unit of the transmitting party A continuously monitors the fill level of the transmission buffer and the throughput of the connection. When the quality of the connection becomes poorer and the number of error increases, the following events take place:

1) the number of re-transmissions of the RLP frames increases,
2) the fill level of the transmission buffer reaches the flow control activation level, whereby the flow control is activated,
3) the number of the re-transmissions of single frames reaches a predetermined maximum value, but, in accordance with the invention, this is disregarded,
4) The throughput of the connection drops to a decision value, which is a value between the original nominal user rate and a half of the original nominal user rate.

When conditions 2 and 4 are both valid, the L2R/RLP unit of the transmitting party A requests a change of the channel coding scheme by means of a CMM procedure, and changing the traffic channel to a full-rate traffic channel in order to maintain the original nominal data rate. After a successful CMM procedure and allocation of a full-rate traffic channel, data transmission continues at the original data rate, but with a better channel coding scheme FEC.

When the channel coding scheme has been changed for a more efficient one, the L2R/RLP unit of the transmitting party A continuously monitors the throughput of the connection for returning the original channel coding scheme and channel resources if the radio conditions change.

Example 1. Communication takes place on a half-rate GSM traffic channel on which the original user rate is 4.8 kbit/s and the radio interface rate is 6 kbit/s. When the throughput of the connection drops below the decision value, e.g. to 4 kbit/s, the fill level of the transmission buffer reaches the flow control activation level, and the flow control is activated. The L2R/RLP unit then requests the CMM procedure for changing for a full-rate traffic channel having a user rate of 4.8 kbit/s and the radio interface rate of 12 kbit/s. Data transmission thus continues at the original user rate, but with a more efficient channel coding scheme FEC, as the convolution code ratio of a full-rate channel is $\frac{1}{3}$ with user rate 4.8 kbit/s, whereas that of a half-rate channel is $\frac{1}{2}$.

If the requested full-rate channel is not available, data transmission continues on the existing half-rate traffic channel. The L2R/RLP activates the retry timer. If the present conditions are still valid after the timer has expired, a new attempt is made for increasing the channel capacity, and, if the new attempt fails, the timer is re-activated etc. If the throughput of the connection still drops to the lowest predetermined decision value, the channel coding scheme of a half-rate traffic channel is changed for a more efficient one with the CMM procedure. A sensible value for said lower predetermined decision value is below a half of the original nominal user rate.

Example 2. Data transmission takes place on a half-rate traffic channel on which the original user rate is 4.8 kbit/s, the radio interface data rate is 6 kbit/s and FEC=$\frac{1}{2}$. When the quality of the connection becomes poorer, the throughput drops below 2.4 kbit/s, and the fill level of the transmission buffer reaches the flow control activation level, and the flow control is activated. Simultaneously, the number of the re-transmissions of single frames may reach the predetermined maximum value, but this is disregarded in accordance with the invention. The L2R/RLP unit requests a CMM procedure for changing the traffic channel for a configuration having a user rate of 2.4 kbit/s and the radio interface rate of 3.6 kbit/s. Thereafter, data transmission takes place on a half-rate traffic channel at a lower nominal data rate 2.4 kbit/s, but, correspondingly with a more efficient channel coding scheme FEC=$\frac{1}{3}$.

4.0 Application to a single-channel service based on a full-rate channel

Let us assume that a mobile station MS has an ongoing non-transparent circuit switched data connection on a full-rate traffic channel. The L2R/RLP unit of the transmitting party A continuously monitors the fill level of the transmission buffer, as well as the throughput of the connection. When the quality of the connection becomes poorer and the number of errors decreases, the following events take place:

1) the number of re-transmissions of the RLP frames increases,
2) the fill level of the transmission buffer reaches the flow control activation level, and the flow control is activated,
3) the number of the re-transmissions of single frames reaches a predetermined maximum value, but, in accordance with the invention, this is disregarded,
4) The throughput of the connection drops to a decision value, which is below a half of the original nominal user rate.

When conditions 2 and 4 are both valid, the L2R/RLP unit of the transmitting party A requests a change of the channel coding scheme by means of a CMM procedure. After a successful CMM procedure, data transmission continues on the same single traffic channel at a lower nominal data rate (half of the original), but with a better channel coding scheme FEC.

After changing for a more efficient channel coding scheme, the L2R/RLP unit continuously monitors:

fill level of the transmission buffer as well as the throughput of the connection for detecting a possible need to change for an even better channel coding scheme, the throughput of the connection for returning the faster transmission rate if the radio conditions change.

This can be illustrated with example 3. The original user rate of a full-rate channel is 9.6 kbit/s, the radio interface rate is 12 kbit/s, and FEC=$\frac{1}{2}$. The throughput of the connection drops below 4.8 kbit/s and the fill level of the transmission buffer reaches the flow control activation level, and flow control is activated. Thus, the L2R/RLP unit requests a CMM procedure, which changes the user rate to 4.8 kbit/s and the radio interface rate to 12 kbit/s. Thereafter, data transmission continues at a lower nominal user rate, but with a more efficient channel coding FEC=$\frac{1}{3}$.

5.0 Application to a multichannel high-speed data transmission

The highest allowable user data rate on one GSM traffic channel is limited to 9.6 kbit/s.

The previous applications FI-942,190 and FI-945,817 of the applicant disclose a procedure in which two or more time-slots are allocated from the same TDMA frame to a mobile station MS that requires data transmission at a higher transfer rate than what can be provided on one traffic channel. The maximum user rate on a multichannel data connection is the number of parallel traffic channels x the user rate 9.6 kbit/s of one traffic channel. Thus, e.g. a user rate of 19.2 kbit/s can be provided by two traffic channels at the minimum. This procedure is disclosed in this application as an example of carrying out high-speed data transmission based on a plurality of parallel traffic channels in a radio system. As to the closer details of this procedure, reference is made to the above-mentioned applications. It must be noted, however, that the only thing relevant to the invention is the possibility to establish a multichannel transmission connection, and the object of the invention is thus primarily to change the efficiency of the channel capacity and the channel coding scheme when the quality of the connection varies.

FIG. 5 illustrates the architecture of the GSM network implementing this kind of data transmission employing a plurality of parallel traffic channels. FIG. 5 is similar to FIG. 1 except for the fact that in FIG. 5, between the terminal adaptation function TAF and the interworking function IWF there is a circuit switched non-transparent connection consisting of N parallel traffic channels ch0-chn, wherein N=1, 2, 3, . . . In the mobile station, the TAF acts as a divider, distributing the incoming high-speed data signal DATA IN from the data terminal equipment into parallel traffic channels ch0-chn, as well as a combiner, which combines the low-speed subsignals received from the parallel traffic channels ch0-chn again with the high-speed data signal DATA OUT. Correspondingly, at the second end of the multichannel data connection, the IWF acts as a distributor distributing the incoming high-speed data signal DATA IN to parallel traffic channels ch0-chn, and as a combiner, which combines the low-speed data signals received from the parallel traffic channels again with a high-speed data signal DATA OUT.

Figure 2:
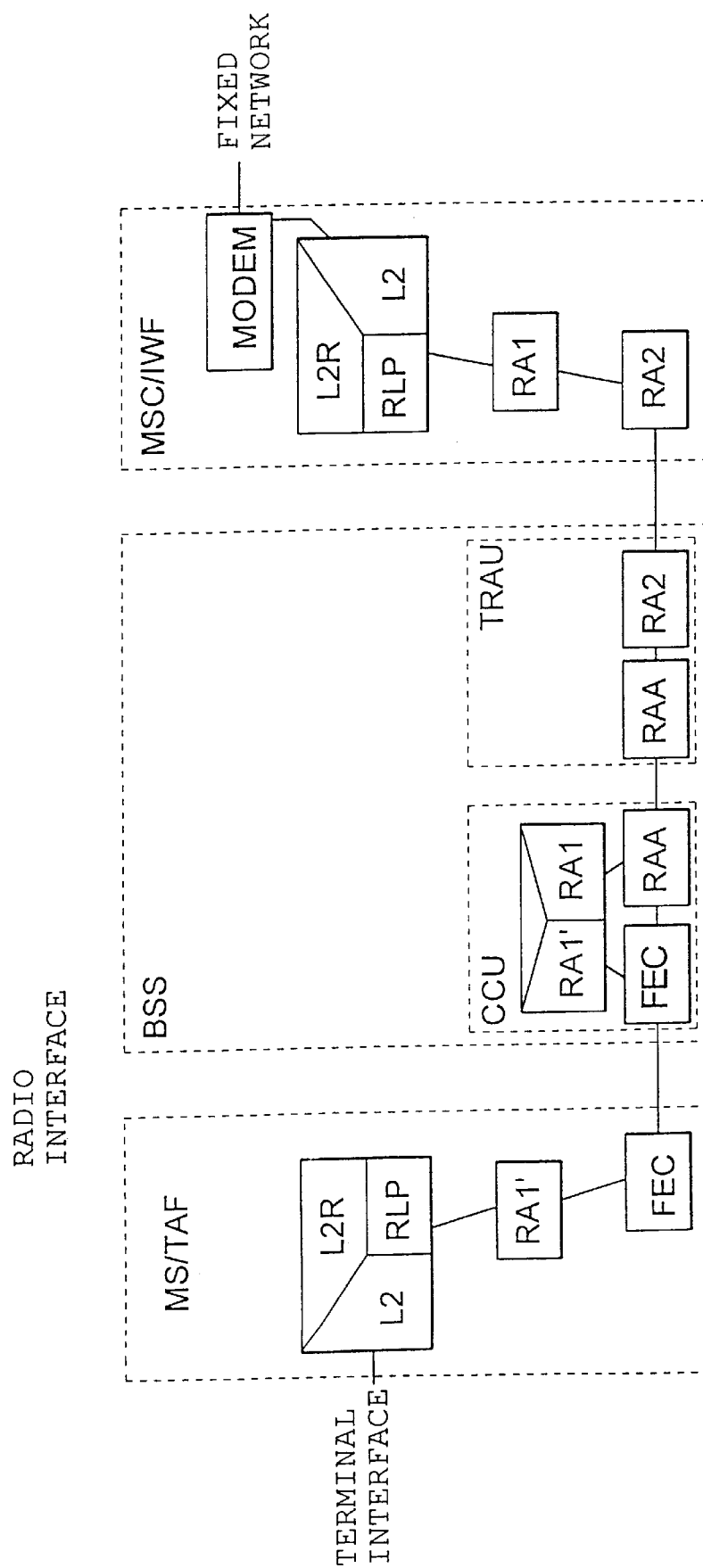
FIG. 2 is a block diagram showing the functional units of a single-channel non-transparent GSM traffic channel in different protocol layers.

The protocol structure shown in FIG. 2 also holds for multichannel connection architecture shown in FIG. 5. In the preferred embodiment of the invention, the L2R/RLP unit is common to all traffic channels allocated for the same connection, also acting as the distributor and combiner mentioned above. Each traffic channel has, however, rate adaptation (RA) and channel coding (FEC) functions of their own in accordance with FIG. 2. A multichannel data connection is thus substantially similar to the single-channel data connection from the point of view of the L2R/RLP unit. The "transmission channel" between the L2R/RLP units only has a larger capacity than before.

In the following, the operation of the L2R/RLP unit will be disclosed in more detail. A mobile station has an ongoing non-transparent circuit switched data connection comprising one or more traffic channels in a system that is capable of high-speed multichannel data transmission. The L2R/RLP unit of the transmitting party A continuously monitors the fill level of the transmission buffer and the throughput of the connection. When the quality of the connection becomes poorer and the number of errors increases, the following events take place:

1) the number of re-transmissions of the RLP frames increases,
2) the fill level of the transmission buffer reaches the flow control activation level, and the flow control is activated,
3) the number of the re-transmissions of single frames reaches a predetermined maximum value, but, in accordance with the invention, this is disregarded,
4) The throughput of the connection drops to a decision value. The decision value may be some value between the current nominal user rate and a half of the current nominal user rate as it is possible to request more channel capacity in order to compensate the decreased data rate on a single traffic channel due to changing for a more efficient channel coding scheme.

When both 2) and 4) are valid, the L2R/RLP unit of the transmitting party A requests increasing of the channel capacity and changing for a more efficient channel coding scheme by means of a CMM procedure. If e.g. one traffic channel is currently in use, a second traffic channel is requested from the same carrier wave. After a successful channel allocation and CMM procedure data transmission continues at the same or almost the same data rate as originally, but with a better channel coding scheme FEC.

Additional channel capacity may be requested depending on the original channel capacity e.g. in the following way:

| original capacity | requested additional capacity |
|---|---|
| 1 | 1 |
| 2 | 2 |
| 3 | 3 |
| 4 | 4 |
| 5 | 3 |
| 6 | 2 |
| 7 | 1 |

The decision value of the throughput is different in cases in which it is not possible to double the channel capacity, since the original nominal user rate cannot be reached after the CMM procedure and changing the channel coding scheme. As a rule, it can be stated that the lower the percentage of the additional traffic channels, the lower the decision value for the throughput is by means of which the change of the channel coding scheme and additional channel capacity are requested.

After changing for a more efficient channel coding scheme, the L2R/RLP unit of the transmitting party A continuously monitors:
- the fill level of the transmission buffer and the throughput of the connection for detecting a possible need for changing for a more efficient channel coding scheme and requesting additional capacity,
- the throughput of the connection for detecting a possibility to restore the higher speed channels and release the additional channel resources if the radio conditions improve.

This can be illustrated with example 4. Let us assume that a non-transparent data connection has been established on one full-rate traffic channel on which the original user rate is 9.6 kbit/s, the radio interface rate is 12 kbit/ and FEC=½. The throughput of the connection drops below the predetermined decision value, e.g. 8 kbit/s, and the fill level of the transmission buffer reaches the flow control activation level, and flow control is thus activated. Simultaneously, the number of re-transmissions of single frames may reach the predetermined maximum value, but this is disregarded in accordance with the invention. The L2R/RLP unit then requests one more full-rate traffic channel having a user rate of 4.8 kbit/s, a radio interface rate of 12 kbit/s and FEC=⅓. In addition, the L2R/RLP unit requests a CMM procedure by means of which the original traffic channel is changed for a configuration having a user rate of 4.8 kbit/s, a radio interface rate of 12 kbit/s, and FEC=⅓. Thereafter, data transmission continues on two traffic channels at a total nominal data rate of 4.8+4.8 kbit/s=9.6 kbit/s (the original nominal user rate), and with a more efficient channel coding scheme FEC=⅓.

Provided that the requested additional channels are not available, data transmission continues with the present channel configuration. The L2R/RLP activates the retry timer, however. If the same situation continues still after the timer has expired, a new attempt is made for increasing the channel capacity, and if the new attempt fails, the timer is re-started etc. If the throughput of the connection still weakens to a lower predetermined decision value, the channel coding scheme of each available traffic channel is changed for a more efficient one by means of a CMM procedure. A sensible lower predetermined decision value is a value below a half of the original nominal user rate.

This may be illustrated with example 5. Let us assume that there is an ongoing non-transparent data connection on two parallel traffic channels where the original user rate of the connection is 19.2 kbit/s, the radio interface rate is 12 kbit/s on both traffic channels, and FEC=½. Thereafter, the throughput of the connection drops below 9.6 kbit/s, and the fill level of the transmission buffer reaches the flow control activation level, and flow control is activated. The number of re-transmissions of individual frames may thus reach a predetermined maximum value, but this is disregarded. There are no additional traffic channels available, in which case the L2R/RLP unit requests a CMM procedure, which will change the configuration of the present traffic channels so that the user rate is 4.8 kbit/s, the radio interface rate 12 kbit/s, and FEC=⅓. Thereafter, data transmission continues on these two traffic channels at a lower combined nominal data rate 4.8+4.8=9.6 kbit/s, but correspondingly with a more efficient channel coding scheme FEC=⅓.

6.0 Flexible application to a high-speed multichannel data service Let us assume that a mobile station MS has an ongoing non-transparent circuit switched connection on one or more traffic channels in a system that is capable of high-speed multichannel data transmission.

In such a case, the L2R/RLP unit of the transmitting party A continuously monitors the fill level of the transmission buffer and the throughput of the connection. When the quality of the connection becomes poorer and the number of errors increases, the number of re-transmissions of RLP frames increases. At some stage, the fill level of the transmission buffer reaches the flow control activation level, and flow control is thus activated. The number of re-transmissions of individual frames can also reach the predetermined maximum value, but it is disregarded. The throughput of the connection drops below the predetermined maximum decision value. The L2R/RLP unit then requests increasing the number of radio channels. If the required channel capacity is available, the procedure continues as above in 4.0. If the requested channel capacity is not available, the decision value of throughput is decreased stepwise, and data transmission continues with the present channel configuration. If the combined throughput drops to a new decision value, a corresponding amount of additional capacity is requested, which is less than the additional capacity corresponding to the maximum decision value. If this additional capacity is available, the procedure continues as in the case described above. If the requested additional capacity is not available, the throughput value is further decreased stepwise and data transmission is continued with the present channel configuration until the throughput reaches a new decision value.

Although the invention has been disclosed with reference to some specific embodiments, it is obvious that the description is only made by way of example, the disclosed embodiments allowing alterations and modifications without deviating from the scope and the spirit of the invention set forth in the attached claims.

We claim:

1. A method for non-transparent data transmission in a digital telecommunications system, comprising:

establishing a non-transparent data connection having a nominal data rate, a first transmission capacity and a first channel coding scheme;

transmitting data over the non-transparent data connection in data frames using a communication protocol that acknowledges received correct data frames and re-transmits received defective data frames;

buffering the data frames to be transmitted in a transmission buffer;

storing a transmitted data frame in the transmission buffer in case of possible re-transmission, until an acknowledgement of successful reception is received;

monitoring a throughput of the non-transparent data connection on a basis of a number of re-transmissions; and requesting additional transmission capacity and a more efficient channel coding scheme for said data connection if the throughput of the data connection drops to a predetermined threshold value.

2. A method as defined in claim 1, comprising:

monitoring a fill level of the transmission buffer; and requesting additional transmission capacity and the more efficient channel coding scheme for said data connection if the throughput of the data connection drops to the predetermined first threshold value and the fill level of the transmission buffer reaches a predetermined threshold level.

3. A method as defined in claim 2, comprising:

maintaining the first channel coding scheme if a requested additional channel capacity is not available; and repeating the request for more additional transmission capacity and the more efficient channel coding scheme at regular time intervals if the throughput of the data connection does not increase from said predetermined first threshold value and if the fill level of the transmission buffer does not decrease from said predetermined threshold level, changing the channel coding scheme for the more efficient channel coding scheme without allocating more transmission capacity if the throughput of the data connection decreases to a predetermined second threshold level which is lower than the predetermined first threshold value.

4. A method as defined in claim 1, comprising:

changing the more efficient channel coding scheme for the data connection; and allocating additional transmission capacity for the data connection corresponding to the more efficient channel coding scheme so that an original nominal user rate remains unchanged or nearly unchanged.

5. A method as defined in claim 1, comprising:

maintaining the first transmission capacity and the first channel coding scheme if the requested additional transmission capacity is not available, which capacity is required with the more efficient channel coding scheme for maintaining an original nominal user rate unchanged or nearly unchanged.

6. A method as defined in claim 4, comprising:

maintaining the first channel coding scheme if the requested additional transmission capacity is not available, reducing said predetermined first threshold value for the throughput, requesting additional transmission capacity and the more efficient channel coding scheme for said data connection if the throughput of the data connection drops to said reduced threshold value and if the fill level of the transmission buffer has not decreased below said predetermined threshold value.

7. A method as defined in claim 1, comprising allocating one or more traffic channels to the data connection as additional transmission capacity.

8. A digital telecommunications system comprising a transmitting party having a transmission buffer, a receiving party, a non-transparent circuit switched data connection between the transmitting party and a receiving party, channel coding means on said data connection, and a communication protocol in which data is transmitted over said data connection in data frames so that received correct data frames are acknowledged and received defective data frames are retransmitted, said transmission buffer buffering data frames to be transmitted and storing the transmitted data frames until it receives an acknowledgement of successful reception, wherein the transmitting party or a receiving party is arranged to monitor a throughput of the non-transparent data connection on a basis of a number of re-transmissions, and that the transmitting or the receiving party is arranged to request additional transmission capacity and a more efficient channel coding scheme for the data connection in question if the throughput of the data connection drops to a predetermined threshold-value.

9. A system as defined in claim 8, wherein the transmitting party is arranged to monitor a fill level of the transmission buffer, and that the transmitting party is arranged to request more transmission capacity and a more efficient channel coding scheme for said data connection if the throughput of the data connection drops to the predetermined first threshold value and the fill level of the transmission buffer increases to the predetermined threshold value.

10. A system as defined in claim 8, wherein an amount of the requested additional transmission capacity is such that an original nominal user data rate remains unchanged or nearly unchanged after changing for the more efficient channel coding scheme.

11. A system as defined in claim 8, wherein the the digital telecommunications system is a multiple access mobile communication system in which the data connection comprises one traffic channel on a radio path, and that increasing the transmission capacity of the data connection includes changing a half-rate traffic channel for a full-rate traffic channel.

12. A system as defined in claim 8, wherein the digital telecommunications system is a multiple access mobile communication system in which the data connection comprises one traffic channel or a plurality of traffic channels on a radio path, and that increasing a transmission capacity of the data connection includes increasing a number of traffic channels allocated for the data connection.

13. A system as defined in claim 8, wherein the transmitting party is a terminal adaptation function of a mobile station, and the receiving party is an interworking function (IWF) of a mobile communication network.

14. A system as defined in 8, wherein the transmitting party is an interworking function of a mobile communication network, and the receiving party is a terminal adaptation function of a mobile station.

\* \* \* \* \*